United States Patent
Matsumoto

(10) Patent No.: US 7,444,062 B2
(45) Date of Patent: Oct. 28, 2008

(54) PLAYBACK SYSTEM

(75) Inventor: Mutsumi Matsumoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 647 days.

(21) Appl. No.: 11/030,498

(22) Filed: Jan. 6, 2005

(65) Prior Publication Data
US 2005/0152677 A1 Jul. 14, 2005

(30) Foreign Application Priority Data
Jan. 9, 2004 (JP) ............... 2004-004076

(51) Int. Cl.
*H04N 5/76* (2006.01)
(52) U.S. Cl. .......................... 386/69; 386/70
(58) Field of Classification Search .............. 386/1, 386/46, 83, 69–70
See application file for complete search history.

(56) References Cited

U.S. PATENT DOCUMENTS 6,882,793 B1 * 4/2005 Fu et al. ............. 386/95
7,034,777 B1 * 4/2006 McLarty et al. ............. 345/2.2
2002/0154888 A1 * 10/2002 Allen et al. ............. 386/46

FOREIGN PATENT DOCUMENTS

| JP | 2000-165787 A | 6/2000 |
| JP | 2001-016545 A | 1/2001 |
| JP | 2001-203973 A | 7/2001 |
| JP | 2001-3128 A | 11/2001 |

\* cited by examiner

*Primary Examiner*—Thai Tran
*Assistant Examiner*—Nigar Chowdhury
(74) *Attorney, Agent, or Firm*—Canon USA Inc I.P. Div

(57) ABSTRACT

A playback system for playing back image data from a recording medium on which image data of a plurality of titles is recorded and for outputting the played-back image data to an external display device while an image related to the played-back image data is being displayed on a display section. In response to an instruction for displaying a representative image list of the plurality of titles, the representative image list is displayed on the display section while the played-back image data is being output to an external display device.

3 Claims, 7 Drawing Sheets

US 7,444,062 B2

PLAYBACK SYSTEM

BACKGROUND OF THE INVENTION

1. Field of the Invention

The present invention relates to a playback system and more particularly to a playback system configured to control display of a playback image.

2. Description of the Related Art

Hitherto, a video camera for photo-taking a moving image and recording it on a recording medium such as a DVD has been known. In this type of video camera, when an image recorded on a disc is to be played back, a list of thumbnail images of recorded titles is displayed, and a title to be played back is selected from among the displayed thumbnail images and is played back. Furthermore, this type of video camera is configured so that display devices, such as a viewfinder and a liquid-crystal panel, used during photo-taking, are incorporated in the main unit, and during playback, a list of thumbnail images and a playback image are displayed. Also, the video camera includes an external output terminal for outputting played-back image data to an external display device, such as a television monitor, and for displaying it.

At this time, the image displayed on the liquid-crystal panel and the image displayed on the television monitor are the same image. Also, when a thumbnail list is displayed and an image to be played back is selected, the configuration is such that operation can be performed while viewing the screens of the liquid-crystal panel and the television monitor. Such a configuration is disclosed in Japanese Patent Laid-Open No. 2001-312880.

In such a video camera, when a playback image is being viewed and the user desires to playback a different title, the user temporarily stops the current playback of the image. The user then views a thumbnail list screen from which the desired title is selected for playback.

SUMMARY OF THE INVENTION

The present invention is provided to resolve one or more of the above-described disadvantages of conventional systems.

Among other advantages, the present invention is configured to allow selection of an image for playback without stopping playback of the image currently being viewed.

In one aspect, the present invention provides a playback system including: playback means for playing back image data of a plurality of titles from a recording medium; display means for displaying an image related to the image data played back from the playback means; output means for outputting the played-back image data to an external display device; and control means for displaying a representative image list of the plurality of titles on the display means while the image data played back from the recording medium is output to the external display device by the output means.

According to another aspect of the present invention, a playback method is disclosed for playing back image data from a recording medium on which image data of a plurality of titles is recorded and for outputting the played-back image data to an external display device while an image related to the played-back image data is being displayed on a display section. The playback method includes displaying, in response to an instruction for displaying a representative image list of the plurality of titles, the representative image list on the display section instead of the image data while the played-back image data is being output to the external display device.

According to another aspect of the present invention, a playback system is disclosed. The playback system includes a playback unit configured to play back image data of a plurality of titles from a recording medium; a display unit configured to display an image related to the image data played back by the playback unit; an output unit configured to output the played-back image data to an external display device; and a control unit configured to control display of a representative image list of the plurality of titles on the display unit while the image data played back from the recording medium is being output to the external display device by the output unit.

Further features and advantages of the present invention will become apparent from the following description of the embodiments with reference to the attached drawings.

DETAILED DESCRIPTION OF THE EMBODIMENTS

Figure 1:
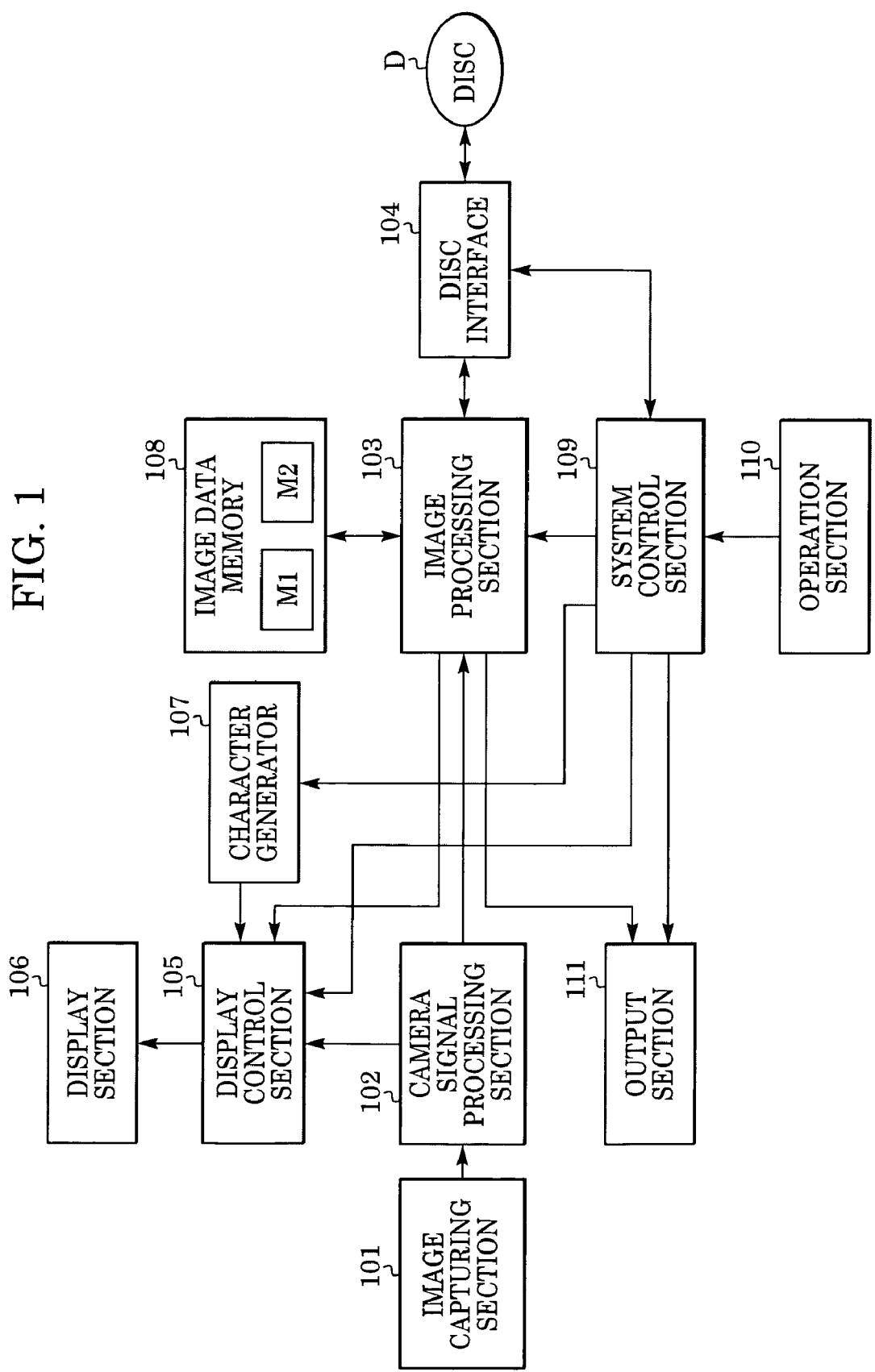
FIG. 1 is a block diagram showing the configuration of a video camera according to an embodiment of the present invention.

FIG. 1 is a block diagram showing the configuration of a video camera to which the present invention is applied.

Referring to FIG. 1, reference numeral 101 denotes an image capturing section for photo-taking a subject image and outputting image data. Reference numeral 102 denotes a camera signal processing section for performing known processing on image data from the image capturing section 101. Reference numeral 103 denotes an image processing section for performing processing, such as a coding process and a decoding process, on moving-image data by using an image data memory 108. Reference numeral 104 denotes a disc interface for recording and playing back image data or other data to and from the disc D. Reference numeral 105 denotes a display control section for controlling the display of images on a display section 106 during photo-taking and in the playback mode. Reference numeral 106 denotes a display section including a liquid-crystal panel. Reference numeral 107 denotes a character generator for generating a character signal indicating various kinds of information to be displayed on the display section 106. Reference numeral 108 denotes an image data memory. Reference numeral 109 denotes a system controller for controlling the operation of each section. Reference numeral 110 denotes an operation section. Although not shown, the operation section includes a power-supply switch and a trigger switch for photo-taking, as well as a selection switch SW1, a playback execution switch SW2, and a moving-image confirmation switch SW3. Reference numeral 111 denotes an output section for outputting the played-back image data to an external television monitor and the like. The display control section 105 has a memory (RAM) for storing images to be displayed. The output section 111 has a memory (RAM) for storing image data to be output. In this embodiment, although a DVD is used as a disc D, other disc media can also be used.

Figure 2:
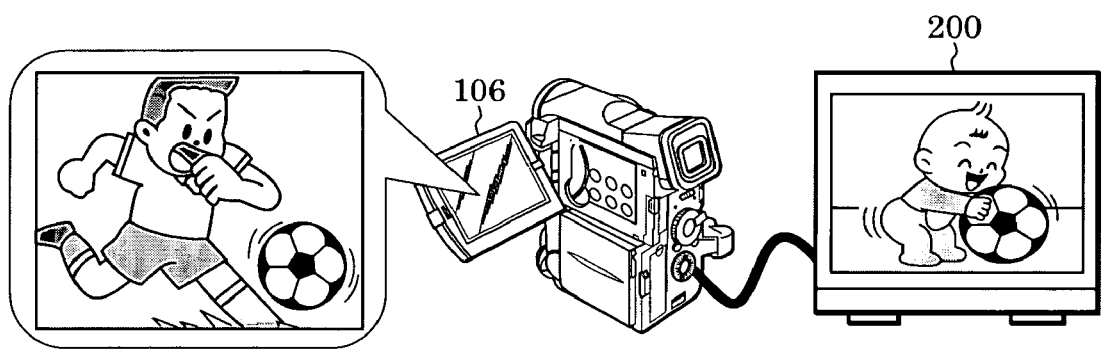
FIG. 2 is an exterior view of a video camera and an external monitor according to an embodiment of the present invention.

FIG. 2 is an exterior view of the video camera of FIG. 1. In FIG. 2, a playback image is displayed on the display section (liquid-crystal panel) 106 and on an external monitor 200.

During photo-taking, the moving-image data that is photo-taken by the image capturing section 101 and that is processed by the camera signal processing section 102 is output to the image processing section 103. The image processing section 103 stores the moving-image data from the camera signal processing section 102 in the image data memory 108, performs coding processing, such as MPEG, on the moving-image data by using the image data memory 108, and outputs the data to the disc interface 104. Furthermore, in response to an instruction from the system control section 109 to initiate photo-taking, the image processing section 103 extracts, for display as a thumbnail, one frame of the recording start portion of the input moving-image data, and outputs it to the disc interface 104. In response to the instruction to initiate photo-taking, the system control section 109 directs the image processing section 103 and the disc interface 104 to record the moving-image data onto the disc D. The disc interface 104 records the moving-image data output from the image processing section 103 on the disc D, and also, records the data of the thumbnail images, together with data management information, in a predetermined recording area of the disc D.

During photo-taking, the moving-image data is also output from the camera signal processing section 102 to the display control section 105, and the system control section 109 directs the display control section 105 to display the moving image from the camera signal processing section 102 on the display section 106. A character signal indicating various kinds of information associated with the photo-taking operation is then generated by the character generator 107, and the information is displayed on the display section 106.

To complete the photo-taking operation, the system control section 109 controls the disc interface 104 in order to stop the recording of the moving-image data, generates management information associated with the recorded moving-image data, and records the management information on the disc D by the disc interface 104. In the present embodiment, a series of moving-image data recorded from start to end of the photo-taking operation is recorded as a single file on the disc D, and is called a "title".

Next, when the title to be played back is selected (by using the operation section 110), the system control section 109 controls the disc interface 104 in order to play back, from the disc D, the moving-image data of the title selected on the basis of the management information read from the disc D, and sends the moving-image data to the image processing section 103. The image processing section 103 writes the played-back moving-image data into the image data memory 108, and also, decodes the played-back moving-image data by using the image data memory 108. Then, the decoded moving-image data is written into the memory area M1 or M2 of the image data memory depending on the output destination.

In this embodiment, the playback image can be simultaneously output to the display section 106 and the output section 111 connected to the external monitor device. The memory M1 is used to store image data to be displayed on the display section 106, and the memory M2 is used to store moving-image data to be output from the output section 111.

The moving-image data stored in the memories M1 and M2 are output to the display control section 105 and the output section 111, respectively.

Figure 6:
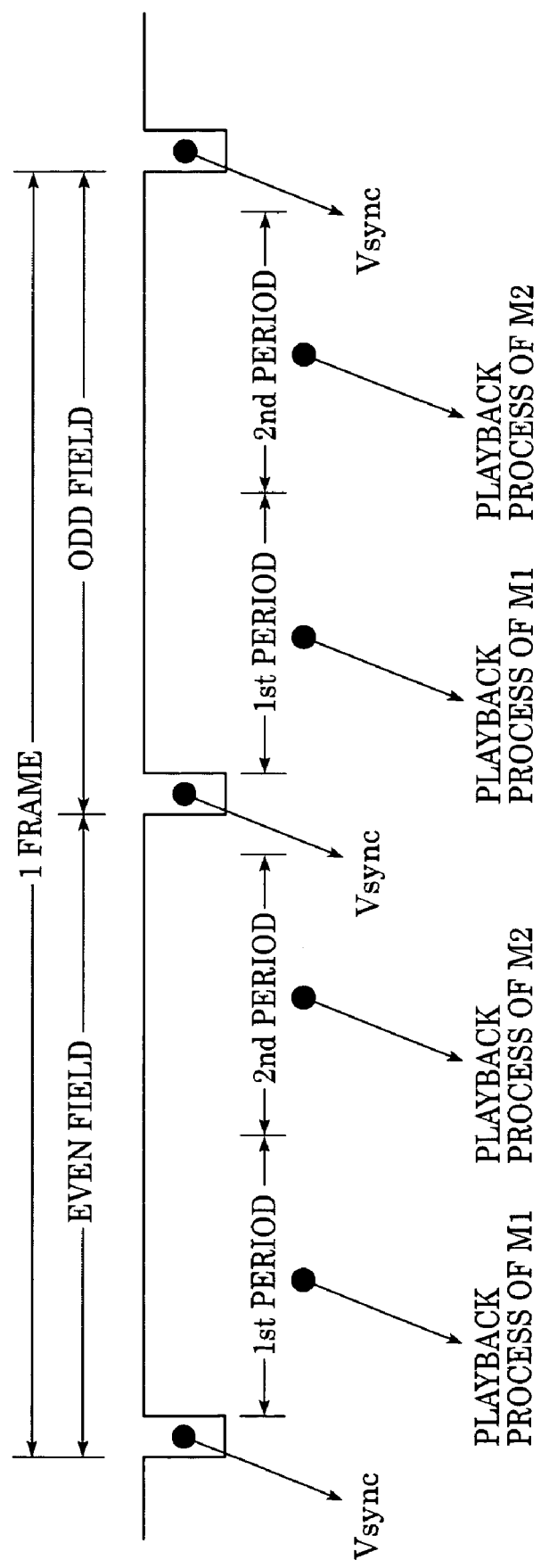
FIG. 6 shows timing for processing of playback image data using a memory.

As shown in FIG. 6, the writing and reading for M1 are performed in the first period in each field of the moving-image data to be displayed, and the writing and reading for M2 are performed in the second period. As a result, a plurality of video signals can be generated using a single playback circuit.

As noted above, the image data to be displayed on the display section 106 and the image data output to the external monitor by the output section 111 are generated independently, and are output to the display control section 105 and the output section 111, respectively.

Thus, when moving-image data output from the output section 111 is being viewed on the external monitor, a thumbnail list screen is observable on the display section 106.

A description of the control operation of the display screen in playback mode will now be provided.

Figure 5:
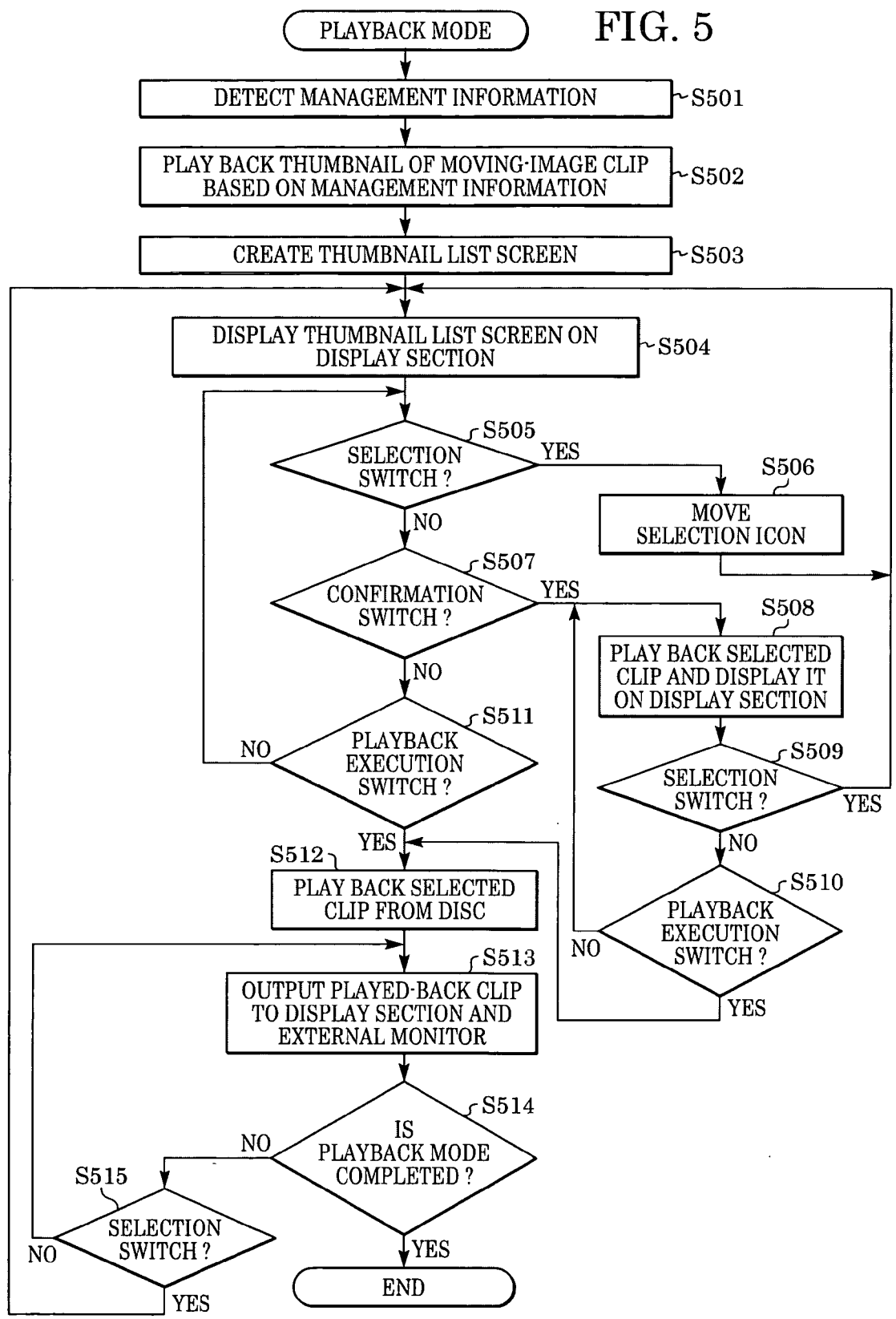
FIG. 5 is a flowchart showing the operation of a playback mode.

FIG. 5 is a flowchart showing the processing of the system control section 109 in the playback mode.

In FIG. 5, when the user initiates playback mode (using operation section 110), management information is read from the disc D (S501), and based on this management information, the thumbnail image data of the title recorded on the disc D is played back (S502). Then, the thumbnail list screen is generated by using the played-back thumbnail image data (S503), and a thumbnail list screen is displayed on the display section 106 (S504). Note that the data of the thumbnail list screen is not output from the output section 111.

Figure 3:
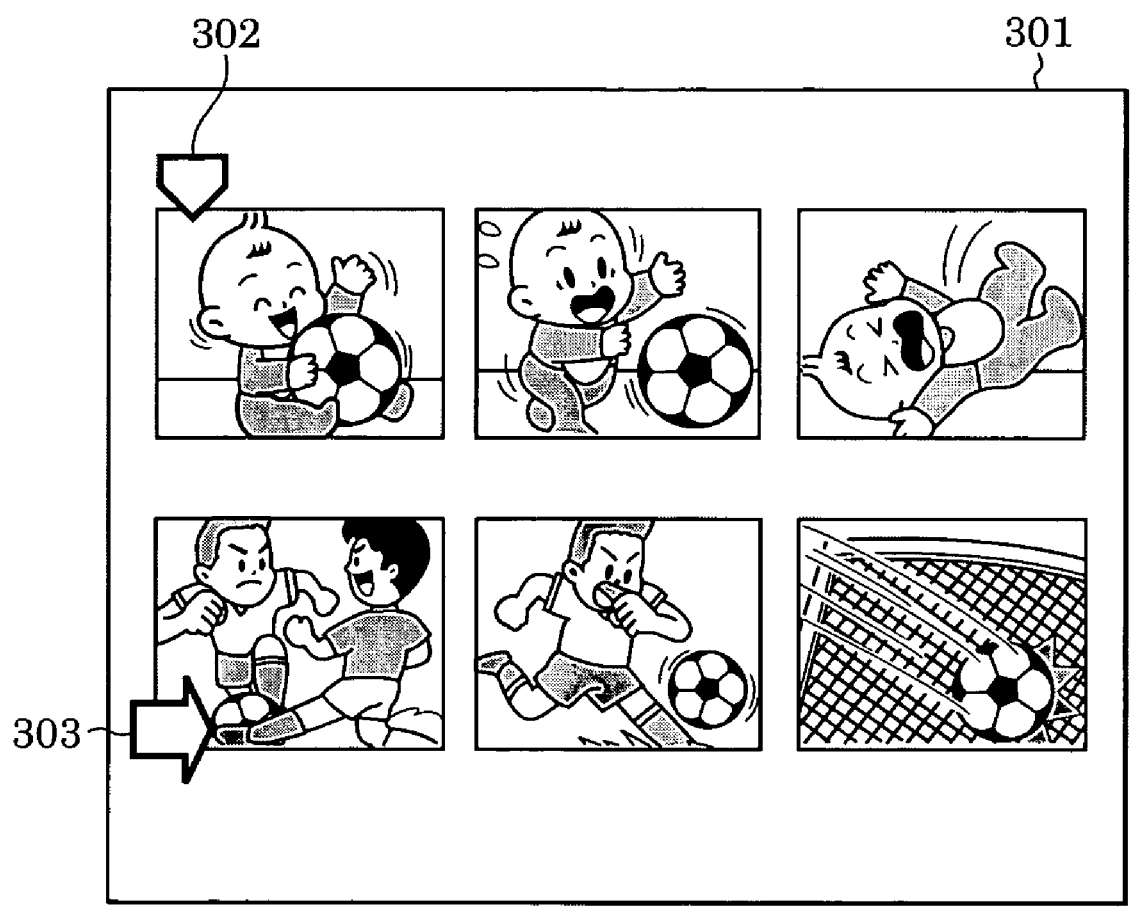
FIG. 3 shows a thumbnail list screen.

FIG. 3 shows a state of the thumbnail list screen. The system control section 109 reduces the screen size of the thumbnail image played back from the disc D, and arranges it as indicated by 301. Furthermore, the system control section 109 generates a thumbnail list screen by adding an icon 302 indicating the title that is being currently selected and played back and an icon 303 indicating the title to be played back next. This icon 303 can be moved as desired by a user by operating the selection switch SW1 as described in step S506 below.

At this time, information, such as the name of each title and the capture time of the photo and date may be displayed together. Furthermore, such a thumbnail list screen may be recorded in advance within the disc D and it may be read.

When the selection switch SW1 is operated while the thumbnail list screen is being displayed on the display section 106 in this manner (S505), the selection icon 303 shown in FIG. 3 is moved (S506). When the moving-image confirmation switch SW3 is operated (S507), the moving-image data of the selected title is played back from the disc D, and the playback image is displayed on the display section 508 (S508). The playback image data for confirming the selected title is not output from the output section 111. When the selection switch SW1 is operated again in this state, the process returns to S504, where the thumbnail list screen is displayed on the display section 106 again. When the playback execution switch SW2 is operated while the moving image for confirmation is being played back by the moving-image confirmation switch (S510), the moving-image data of the currently selected title is played back from the disc D (S512), and the played-back moving-image data is output to the display section 106 and the external monitor via the output section 111 (S513).

Also, when the playback execution switch SW2 is operated to display the thumbnail list screen on the display section 106, the moving-image data of the title that is currently selected by the selection icon 303 is played back from the disc, and is output to the display section 106 and the external monitor via the output section 11 in a similar manner. At this time, the playback moving image is displayed on the display section 106 instead of the thumbnail list screen.

At step S514, playback mode is completed, when an instruction to end the playback mode is received. Furthermore, when there is no instruction for completion, that is, when the selection switch is operated in a state in which the playback image is being displayed on the display section 106 and the external monitor (S515), while the output of the moving-image data that is being currently played back is continued as is with respect to the external monitor via the output section 111, the process returns to S504, where the thumbnail list screen is displayed on the display section 106.

Hereafter, identical processing is repeated. After the selection switch is operated in S515, while the playback image data is being output to the external monitor, the thumbnail list screen and the moving image for confirmation are displayed using the display section 106.

Figure 4:
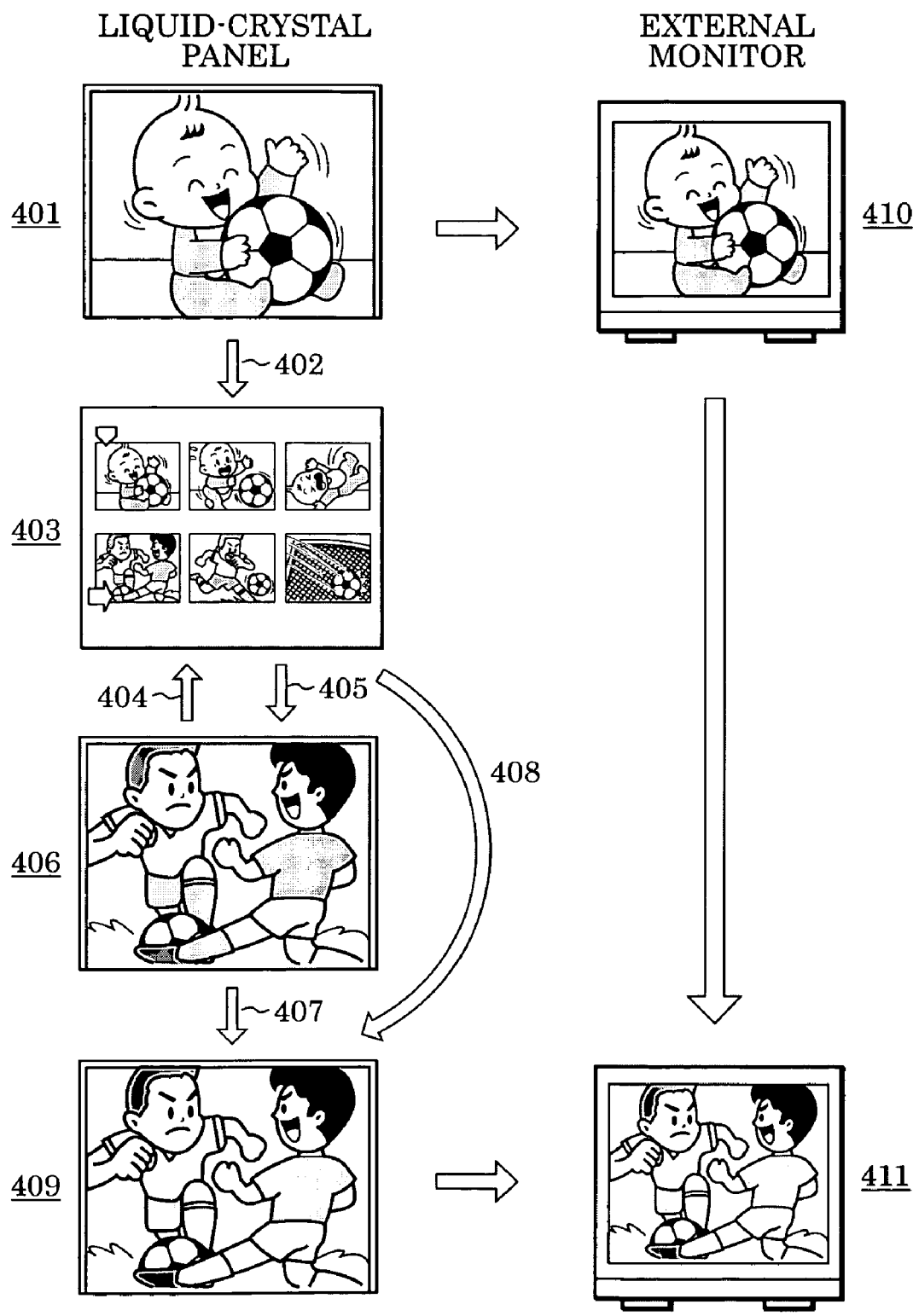
FIG. 4 shows the state of an image displayed on the liquid-crystal panel and the external monitor according to an embodiment of the present invention.

FIG. 4 shows a state of an image displayed on the display section (liquid-crystal panel) 106 and the external monitor connected to the output section 111 in the playback mode.

As indicated by 401 and 410, when the selection switch SW1 is operated in a state in which the playback image is being displayed on the display section (liquid-crystal panel) 106 and the external monitor (402), a thumbnail list screen 403 is displayed on the liquid-crystal panel. When the moving-image confirmation switch SW3 is operated in this state (405), an image 406 of the title that has been selected is displayed on the liquid-crystal panel. When the selection switch SW1 is operated while the confirmation screen is displayed (404), the thumbnail list screen 403 is displayed on the liquid-crystal panel again. Furthermore, when the playback execution switch SW2 is operated while the thumbnail list screen is being displayed or the confirmation image is being played back (408 and 407), the moving image of the selected title is displayed on the liquid-crystal panel (409) and is displayed on the external monitor (411).

Also, when the thumbnail list screen 403 and the confirmation image 406 are being displayed on the liquid-crystal panel, the image of the title 410 is being displayed on the external monitor.

As has thus been described, in this embodiment, image data to be output to the external monitor is generated independently of the image to be displayed on the display section, and the thumbnail list screen for selecting the title is independently displayed on the display section while the playback moving-image data is being output to the external monitor. Therefore, the title to be played back next can easily be confirmed and selected without stopping the viewing of moving image that is currently being played back.

In the above-described embodiment, while the playback image data is being output to the external monitor, the thumbnail list screen is displayed on the liquid-crystal panel. Not being limited to this, for example, the configuration may also be adopted in which the output section of two systems for outputting image data to individual external monitors correspondingly are provided and the thumbnail list screen is displayed on one of the output sections.

Figure 7:
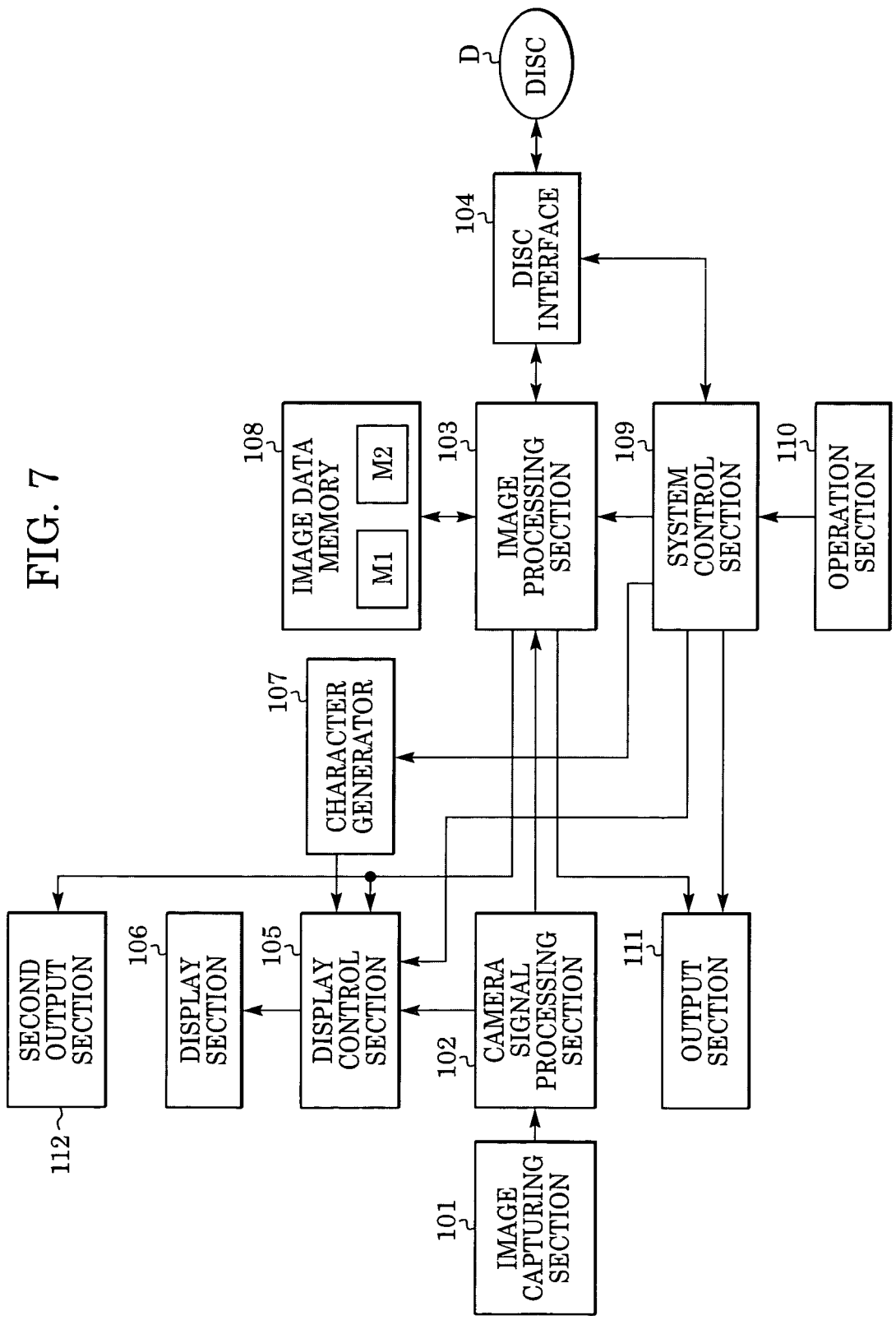
FIG. 7 is a block diagram showing another configuration of the video camera according to an embodiment of the present invention.

The configuration of the video camera in this case is shown in FIG. 7. In FIG. 7, a second output section 112 is provided, and the same image data output to the display section 106 is output from the second output section 112. Therefore, the data of the thumbnail list screen from the second output section 112 can be output to the external display device while the playback image data is being output from the output section 111.

An embodiment in which, in order that various types of devices operate to implement the functions of the above-described embodiments, program code of software for implementing the functions of the above-described embodiments is supplied to a computer within an system or a system, which is connected to the various types of devices, and the various types of devices operate in accordance with the program stored in the computer (CPU or MPU) of the system or the system, falls within the scope of the present invention.

In that case, the program code itself of the software implements the functions of the above-described embodiments. The program code itself and means for supplying the program code to the computer, for example, a recording medium in which such program code is stored, constitute the present invention. Examples of recording media that can be used to record such program code include a flexible disk, a hard disk, an optical disc, a magneto-optical disc, a CD-ROM, a magnetic tape, a non-volatile memory card, and a ROM.

An embodiment in which program code in a case where, not only can the functions of the above-described embodiments be implemented by the computer by executing the supplied program code, but also the functions of the above-described embodiments are implemented by the program code in cooperation with the OS (Operating System) running in the computer or another application software, falls within the scope of the present invention.

A case in which, after the supplied program code is stored in the memory provided in a function expansion board of the computer and a function expansion unit connected to the computer, the CPU provided in the memory provided in the function expansion board and the function expansion unit performs some or the whole of actual processing in accordance with the instructions of the program code, and the functions of the above-described embodiments are implemented by the processing, falls within the scope of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-004076 filed Jan, 9, 2005, which is hereby incorporated by reference herein.

What is claimed is:

1. A playback apparatus comprising:
    playback means for playing back image data of a plurality of titles from a recording medium;
    display means for displaying an image indicated by the image data played back by said playback means;
    output means for outputting said played-back image data to an external display device;
    instruction means for instructing the display means to display a representative image list showing a representative image of the image data of the plurality of titles recorded on the recording medium;
    image data selection means for selecting image data of a desired title from among the image data of the plurality of titles shown on the representative image list displayed on the display means in order that the playback means plays back the selected image data from the recording medium; and control means for controlling, in response to an instruction given from the image data selection means to the playback means to play back the selected image data, the display means to display an image indicated by the selected and played-back image data instead of the representative image list while the output means outputs the selected and played-back image data, wherein, in response to an instruction to display the representative image list, given by the instruction means while the output means outputs the played-back image data, the control means controls the display means to display the representative image list while the output means outputs the played-back image data.

2. The playback system according to claim 1, further comprising:

image capturing means; and recording means for recording image data obtained by said image capturing means on said recording medium.

3. An image playback apparatus comprising:

a playback unit configured to play back image data of a plurality of titles from a recording medium;

a display unit configured to display an image indicated by the image data played back by the playback unit;

an output unit configured to output the played-back image data to an external display device;

an instruction unit configured to instruct the display unit configured to display a representative image list showing a representative image of the image data of the plurality of titles recorded on the recording medium;

an image data selection unit configured to select image data of a desired title from among the image data of the plurality of titles shown on the representative image list displayed on the display unit in order that the playback unit plays back selected image data from the recording medium; and a control unit configured to control, in response to an instruction give from the image data selection unit to the playback unit to play back the selected image data, the display unit to display an image indicated by the selected and played-back image data instead of the representative image list while the output unit outputs the selected and played-back image data, wherein, in response to an instruction to display the representative image list, given by the instruction unit while the output unit outputs the played-back image data, the control unit controls the display unit to display the representative image list while the output unit outputs the played back image data.

* * * * *